US007418572B2

(12) United States Patent
Hepkin (10) Patent No.: US 7,418,572 B2
(45) Date of Patent: Aug. 26, 2008

(54) PRETRANSLATING INPUT/OUTPUT BUFFERS IN ENVIRONMENTS WITH MULTIPLE PAGE SIZES

(75) Inventor: David Alan Hepkin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 10/920,907

(22) Filed: Aug. 18, 2004

(65) Prior Publication Data

US 2006/0041735 A1 Feb. 23, 2006

(51) Int. Cl.
*G06F 12/10* (2006.01)
(52) U.S. Cl. .......................... 711/204; 710/52; 711/209
(58) Field of Classification Search .................. None
See application file for complete search history.

(56) References Cited

U.S. PATENT DOCUMENTS

| 5,278,963 | A | * | 1/1994 | Hattersley et al. ........... 711/204 |
| 5,956,756 | A | * | 9/1999 | Khalidi et al. .............. 711/207 |
| 6,205,530 | B1 | * | 3/2001 | Kang .......................... 711/202 |
| 6,961,837 | B2 | * | 11/2005 | Haren et al. ................. 711/202 |

OTHER PUBLICATIONS

U.S. Appl. No. 10/697,867, filed Oct. 10, 2003, Hepkin.
U.S. Appl. No. 10/855,847, filed May 27, 2004, Hepkin et al.
Sheffield; Avoid repapping of Data Buffers in AIX Device Drivers; Feb. 1994; pp. 671-672; TBD vol. 37; US.
Blades, et al.; Pre-Allocation of Remote Storage on a Maximum Frame-Size Basis; Nov. 1991; pp. 420-422; TDB n6; US.
Beausoleil; Hierarchical Memory; Jul. 1972; pp. 629-631; TDB; US.
Dayan, et al.; Method of Providing Small Computer Systems with Multiple Input/Output Operations; Dec. 1991; pp. 303-312; TDB n7b; US.

* cited by examiner

*Primary Examiner*—Gary J Portka
(74) *Attorney, Agent, or Firm*—John Biggers; Justin Dillon; Biggers & Ohanian, LLP (57) ABSTRACT

Pretranslating input/output buffers in environments with multiple page sizes that include determining a pretranslation page size for an input/output buffer under an operating system that supports more than one memory page size, identifying pretranslation page frame numbers for the buffer in dependence upon the pretranslation page size, pretranslating the pretranslation page frame numbers to physical page numbers, and storing the physical page numbers in association with the pretranslation page size. Typical embodiments also include accessing the buffer, including translating a virtual memory address in the buffer to a physical memory address in dependence upon the physical page numbers and the pretranslation page size and accessing the physical memory of the buffer at the physical memory address.

1 Claim, 10 Drawing Sheets

PRETRANSLATING INPUT/OUTPUT BUFFERS IN ENVIRONMENTS WITH MULTIPLE PAGE SIZES

BACKGROUND OF THE INVENTION

1. Field of the Invention

The field of the invention is data processing, or, more specifically, methods, systems, and products for pretranslating input/output buffers in environments with multiple page sizes.

2. Description of Related Art

Many computer operating systems use a page-based virtual memory architecture where the operating system virtualizes a process's address space. Under this model, the operating system maps a virtual address in a process address space to a physical memory address on a system.

While virtual addressing can be used under most process and kernel contexts, when doing I/O to or from a memory buffer, the physical memory address of the buffer must be used if an I/O adapter wants to take advantage of direct memory access ('DMA'). Thus, for every I/O, the operating system must translate the virtual addresses of a memory buffer into real addresses. For I/O-intensive applications, performing these translations at every I/O can be very expensive and can significantly impact an application's performance.

To help alleviate this problem, IBM's AIX™ operating system introduced the concept of pretranslating I/O buffers. When a memory buffer is going to be consistently used for I/O, an application, kernel extension, device driver, or other consumer of pretranslation information, can indicate that the buffer should be pretranslated. In this case, the operating system will translate all of the virtual addresses of the buffer to real addresses and save those real address translations (one real address for each page in the range). The operating system will then create a cookie for the memory buffer and store the list of real address translations for the memory buffer in the cookie or associate the list of real address translation for the memory buffer with the cookie, for example, through a pointer.

After a memory buffer has been pretranslated, its cookie is passed to consumers of pretranslation information when pages in the buffer need to be mapped or translated for DMA. Rather than call out to the kernel to translate virtual addresses for the buffer, the consumer will use the list of translated real addresses, that is, the pretranslations, in the buffer's cookie when establishing the mappings needed for DMA. To find the translation for a page in a pretranslation list, the bus device driver just computes an index into the list based on the page number of a page in the buffer.

While this method avoids having to do address translation lookup's on every I/O operation, it does not account for multiple page sizes. On systems using multiple page sizes, all pretranslations will be based on the smallest, base page size. Thus, on a system where 4K pages and 16M pages are being used, pretranslating a 16M results in 4096 pretranslations (one for each 4K chunk of the 16M page).

On large memory systems that heavily utilize larger page sizes, pretranslating everything in the base page size results in a large amount of wasted memory to store all of the extra, unneeded pretranslations. This wasted space significantly reduces the amount of memory that can be used by an application and can negatively impact performance. For example, in database workloads, the space wasted for these pretranslation lists reduces the amount of memory that can be used to cache data for the database in its buffer pools. In addition, more cache misses occur in accessing the pretranslations because the pretranslations are spread across a large amount of memory.

SUMMARY OF THE INVENTION

This invention improves the performance and efficiency of pretranslations on systems that utilize multiple page sizes by associating pretranslations with a page size. Thus, when an operating system is pretranslating a memory buffer, the operating system would associate the pretranslations with a page size backing the memory range. This allows the operating system to utilize a single translation for larger page sizes. For example, on an architecture like POWER4 where 4K and 16M pages are supported, this invention allows the operating system to use a single pretranslation to translate a 16M page rather than 4096 pretranslations to translate each 4K chunk of a 16M page.

This ability to pretranslate with different page sizes has the benefit of effecting a much smaller memory footprint for pretranslation lists that pretranslate memory backed with large page sizes. For large memory systems, i.e., terabytes of memory, this benefit typically represents a significant efficiency, gigabyte level, in memory utilization. In addition, improved cache performance results when accessing pretranslation lists for memory backed with large page sizes. Pretranslation lists may now be much denser for larger page sizes, so that fewer cache lines are required to cache the pretranslation lists, greatly increasing the likelihood that loads of pretranslation information are resolved by a cache.

More particularly, methods, system, and products are disclosed for pretranslating input/output buffers in environments with multiple page sizes that include determining a pretranslation page size for an input/output buffer under an operating system that supports more than one memory page size, identifying pretranslation page frame numbers for the buffer in dependence upon the pretranslation page size, pretranslating the pretranslation page frame numbers to physical page numbers, and storing the physical page numbers in association with the pretranslation page size. In typical embodiments, the buffer includes a quantity of memory organized in pages having virtual page frame numbers and having at least one memory page size. Typical embodiments also include accessing the buffer, including translating a virtual memory address in the buffer to a physical memory address in dependence upon the physical page numbers stored in association with the pretranslation page size and accessing the physical memory of the buffer at the physical memory address.

In typical embodiments, the buffer may include pages of memory having only one page size, and determining a pretranslation page size includes selecting as the pretranslation page size the only one page size of the pages of memory in the buffer. In typical embodiments, the buffer may include pages of memory having two or more page sizes, and determining a pretranslation page size includes selecting as the pretranslation page size a smallest page size from among the page sizes of the pages of memory in the buffer. In embodiments where the buffer includes pages of memory having two or more page sizes, identifying pretranslation page frame numbers for the buffer in dependence upon the pretranslation page size typically includes identifying pretranslation page frame numbers for the buffer that are located inside a memory page.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for pretranslating input/output buffers in environments with multiple page sizes. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

DETAILED DESCRIPTION

Figure 1:
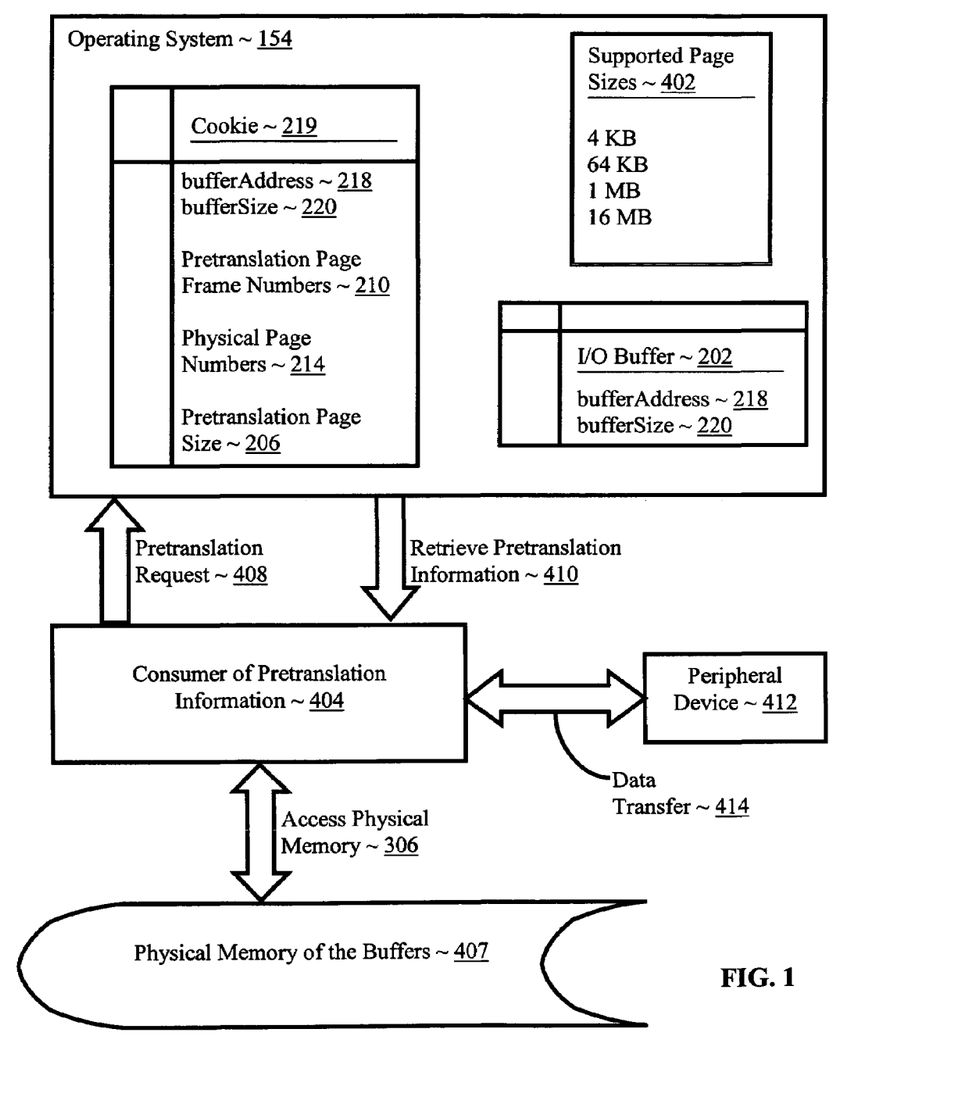
FIG. 1 sets forth a block diagram of an exemplary system for pretranslating input/output buffers in environments with multiple page sizes.

Exemplary methods, systems, and computer program products for pretranslating input/output buffers ('buffers') in environments with multiple page sizes are explained with reference to the accompanying drawings, beginning with FIG. 1. FIG. 1 sets forth a block diagram of an exemplary system for pretranslating input/output buffers in environments with multiple page sizes. The system of FIG. 1 operates generally by determining a pretranslation page size (206) for an input/output buffer (202) under an operating system (154) that supports than one memory page size (402), identifying pretranslation page frame numbers (210) for the buffer (202) in dependence upon the pretranslation page size (206), pretranslating the pretranslation page frame numbers (210) to physical page numbers (214), and storing the physical page numbers (214) in association with the pretranslation page size (206).

Buffer (202) is defined by a virtual memory address (218) and a size parameter (220). Buffer (202) includes a quantity of memory organized in pages characterized by virtual page frame numbers. Because buffer (202) is defined under operating system (154) having the memory making up the buffer to include memory pages of at least one memory page size and optionally two more page sizes in the same buffer.

In the example of FIG. 1, the data structure (219) in which the physical page numbers (214) are stored in association with the pretranslation page size (206) is called a 'cookie.' In the example of Figure, each pretranslation page frame number (210) is shown stored in a pairing with a corresponding physical page number (214) so that each such pairing represents a translation of a virtual memory page number to a physical page number. Address translation in this system is completed with the addition of an offset whose size corresponds to the pretranslation page size (206).

Cookie (219) is shown in FIGS. 1, 3, 5, 6, 7, and generally in the accompanying drawings with a separate field (210) for pretranslation page frame numbers. The representation of a separate field (210) for pretranslation page frame numbers, however, is only for explanation, not for limitation of the present invention. Persons of skill in the art will recognize that pretranslation page frame numbers will often be represented by a sequence such as 0, 1, 2, 3, and so on, so that a pretranslation page frame number for a physical page number corresponds to the physical page number's location in its cookie table column (214 on FIGS. 5, 6, 7). That is, the physical page number representing the translation of pretranslation page frame number 0 may be read from the first row of table column (214), the physical page number representing the translation of pretranslation page frame number 1 may be read from the second row of table column (214), the physical page number representing the translation of pretranslation page frame number 2 may be read from the third row of table column (214), and so on. When pretranslation information is stored in this way, there is no need to include a separate field for pretranslation page frame numbers, and, as a practical matter, many systems for pretranslating input/output buffers in environments with multiple page sizes according to embodiments of the present invention will not do so.

The system of FIG. 1 includes a pretranslation request (408) from a consumer of pretranslation information (404). Upon receiving such a request, operating system (154) is programmed to determine a pretranslation page size (206), identify pretranslation page frame numbers (210), pretranslate the pretranslation page frame numbers (210), and store the physical page numbers (214) in association with the pretranslation page size (206). The operating system is also programmed to make the cookie containing the physical page numbers (214), and the pretranslation page size (206) retrievable (410) by a consumer of pretranslation information (404). The cookie may be retrieved as return data from an operating system call (408) that requested the pretranslation, or may be retrieved later, asynchronously, from storage; the beginning address of the buffer (218) is sufficient information to identify a cookie (219) as a cookie for a particular buffer. The system of FIG. 1 advantageously and efficiently may pretranslate the pretranslation page frame numbers into physical page numbers and create a cookie by storing the physical pages frame numbers in association with a pretranslation page size—only once—thereafter providing the previously prepared cookie for the buffer many times upon receipt of any request for the cookie from any process that consumes pretranslation information. This efficiency in input/output buffer pretranslation is one of the useful benefits of systems for pretranslating input/output buffers in environments with multiple page sizes according to embodiments of the present invention.

The consumer of pretranslation information (404) of the system of FIG. 1 uses the pretranslation information in the cookie to effect DMA transfers (414) of data between a peripheral device (412) and the physical memory of the buffer (407). The consumer (404) uses the pretranslation information in the cookie to access memory with no need to make current system calls for address translations. That is, the consumer (404) of the system of FIG. 1 accesses the buffer by translating virtual memory addresses in the buffer (202) to physical memory addresses in dependence upon the physical page numbers (214) stored with the pretranslation page size (206). The consumer (404) then accesses the physical memory of the buffer (407) at the physical memory addresses.

As mentioned, systems for pretranslating input/output buffers in environments with multiple page sizes according to embodiments of the present invention typically are implemented as automated computing machinery, that is, as computer systems. For further explanation, therefore, FIG. 2 sets forth a block diagram of an exemplary computer system (134) with which systems for pretranslating input/output buffers in environments with multiple page sizes according to embodiments of the present invention may be implemented.

Figure 2:
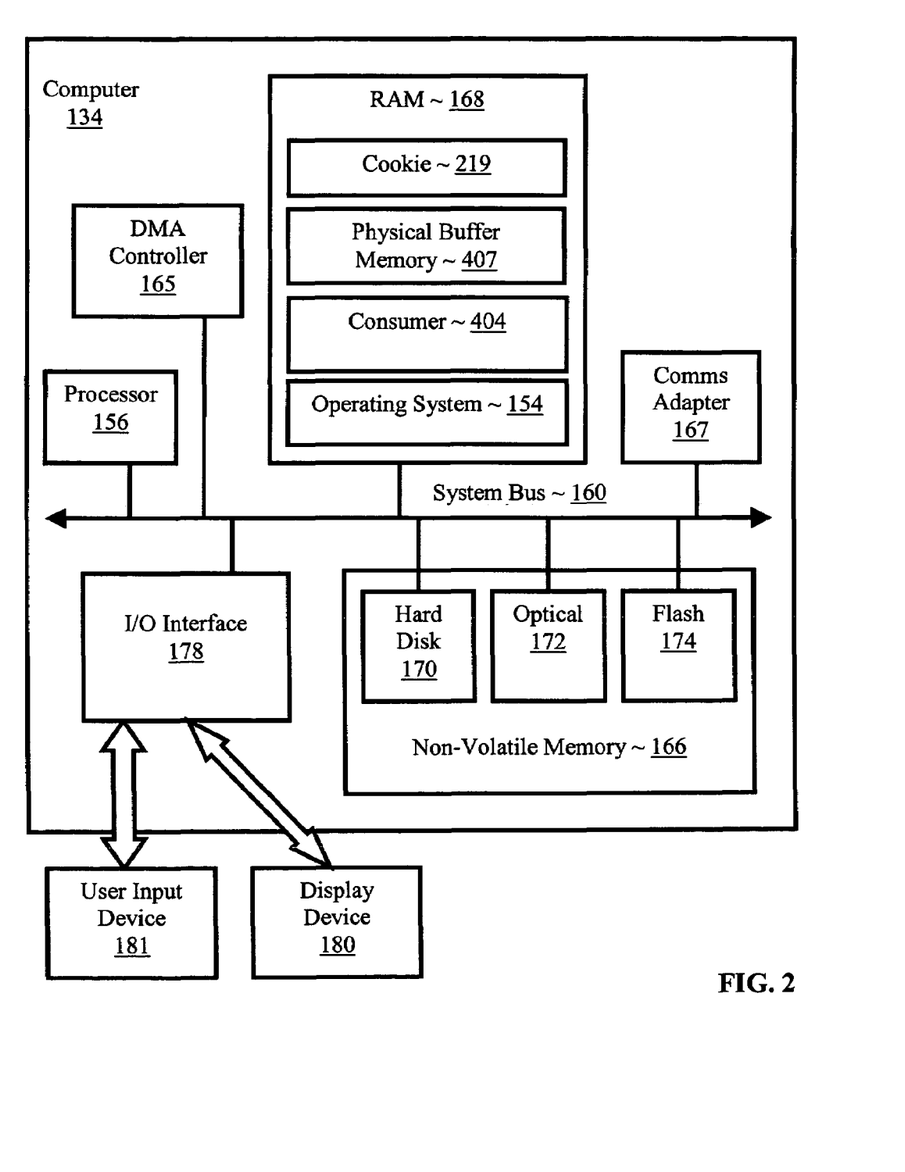
FIG. 2 sets forth a block diagram of an exemplary computer system for pretranslating input/output buffers in environments with multiple page sizes.

The computer (134) of FIG. 2 includes a computer processor (156). Although only one is shown, in fact, such computer systems may include any number of processors. Moreover, the type of processor also is not a limitation of the present invention. Some processors may support execution of only one thread at a time. Other processors may support hardware multi-threading or 'simultaneous multi-threading' ('SMT'), hardware support for multiple independent threads on a processor at the same time, multiple registers sets for threads instead of just one, allowing multiple threads to issue multiple instructions during each cycle of a processor's execution. The use of any kind of processor as will occur to those of skill in the art is well within the scope of the present invention.

The computer of FIG. 2 also includes random access memory (168) ("RAM"). Stored in RAM (168) are a cookie (219) for storing pretranslation information, the physical memory of an input/output buffer (407), a consumer (404) of pretranslation information, and an operating system (154). The operating system (154) is an operating system that supports more than one memory page size. Examples of operating systems that support multiple memory page sizes and that therefore are adaptable for use in pretranslating input/output buffers in environments with multiple page sizes according to embodiments of the present invention include Hewlett Packard's HP-UX™, IBM's AIX™, Sun's Solaris™, and others as will occur to those of skill in the art. The operating system (154) is programmed for pretranslating input/output buffers in environments with multiple page sizes according to embodiments of the present invention by determining a pretranslation page size for an input/output buffer, identifying pretranslation page frame numbers for the buffer in dependence upon the pretranslation page size, pretranslating the pretranslation page frame numbers to physical page numbers, and storing the physical page numbers in a cookie (219) with the pretranslation page size.

The consumer (404) of pretranslation information is programmed for pretranslating input/output buffers in environments with multiple page sizes according to embodiments of the present invention by requesting pretranslations from the operating system (154), retrieving pretranslation information from the operating system—typically in a cookie (219), carrying out translations of virtual memory addresses in a buffer to physical memory addresses by use of the pretranslation information, and accessing the physical memory of the buffer (407) at the physical memory addresses.

The computer of FIG. 2 includes non-volatile computer memory (166) coupled through a system bus (160) to processors (156) and to other components of the computer. Non-volatile memory (166) may be implemented as a hard disk drive (170), optical disk drive (172), electrically erasable programmable read-only memory space (so-called 'EEPROM' or 'Flash' memory) (174), RAM drives (not shown), or as any other kind of non-volatile computer memory as will occur to those of skill in the art.

The example computer system (134) of FIG. 2 includes a communications adapter (167) implementing connections for data communications with other computers, clients, servers, or networks. Communications adapters implement the hardware level of connections for data communications between computers directly with one another and through networks. Examples of communications adapters include modems for wired dial-up connections, Ethernet (IEEE 802.3) adapters for wired LAN connections, and 802.11b adapters for wireless LAN connections.

The example computer system of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181), such as keyboards and mice.

The example computer system (134) of FIG. 2 also includes a DMA controller (165). The consumer (404) of pretranslation information is typically implemented as software that controls such a DMA controller to effect direct memory access ('DMA') by taking temporary control of system bus (160) to access physical buffer memory (407) to read or write data transferred to or from a peripheral device. Examples of peripheral devices that utilize such DMA operations include the communication adapter (167), hard disk drives (170), optical disk drives (172), some forms of flash memory (174), other forms of non-volatile memory (166), I/O interfaces (178) for user input devices (181) and display devices (180), and many other peripheral devices as will occur to those of skill in the art.

The example computer system (134) represents a DMA architecture in which a DMA controller is connected only to the system bus, so that, when the DMA controller accesses physical memory of a buffer, the DMA controller must also use at least one additional system bus cycle to access a peripheral—to read or write the data accessed in memory. Other DMA architectures (not shown) avoid this limitation by embedding the DMA controller directly into a peripheral or by providing a separate I/O bus for communication with peripheral—thereby unloading the system bus from such communications with peripherals. In addition to the three DMA architectures just described, other DMA architectures as will occur to those of skill in the art are operable in systems for pretranslating input/output buffers in environments with multiple page sizes according to embodiments of the present invention.

Figure 3:
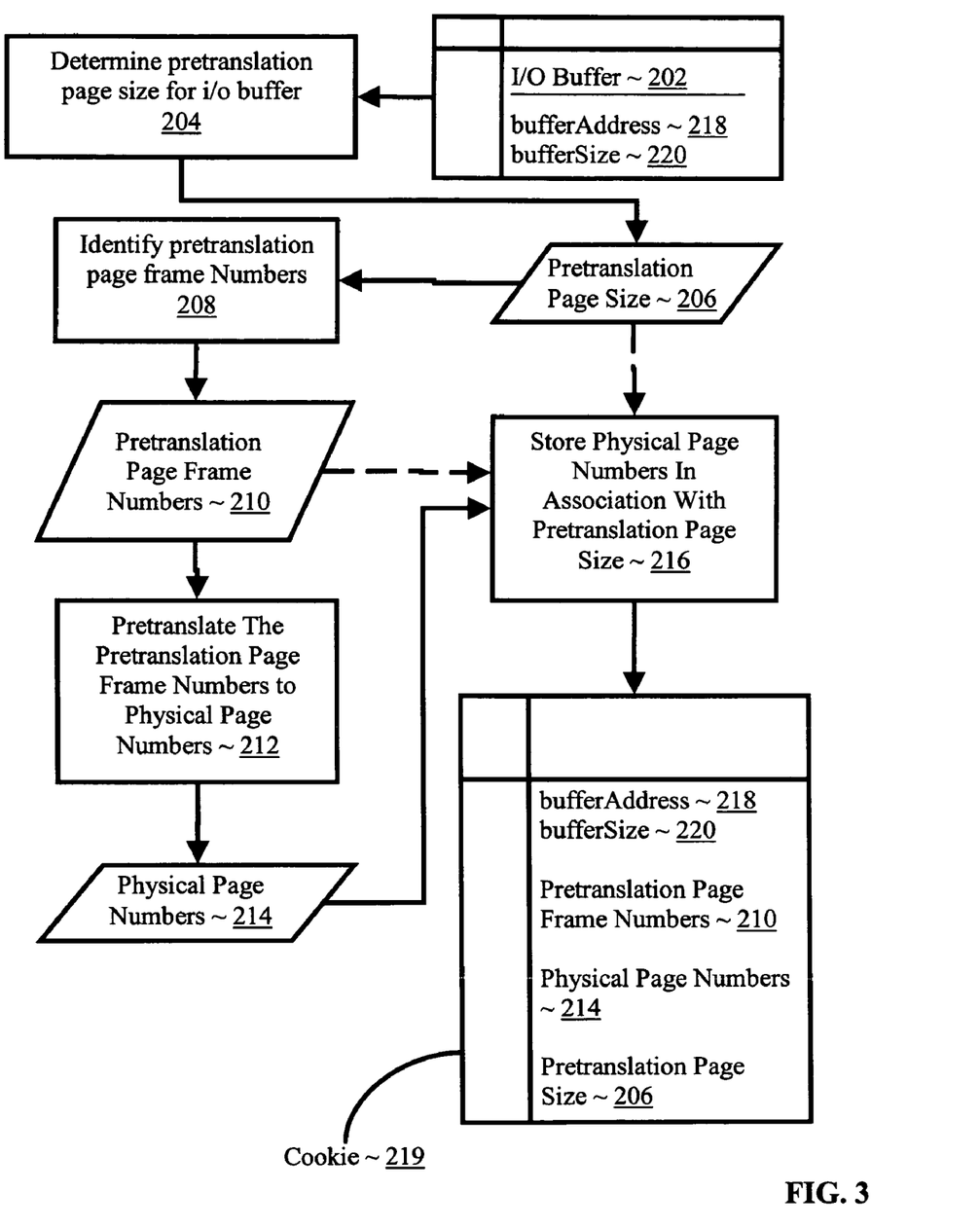
FIG. 3 sets forth a flow chart illustrating an exemplary method for pretranslating input/output buffers in environments with multiple page sizes.

For further explanation, FIG. 3 sets forth a flow chart illustrating an exemplary method for pretranslating input/output buffers in environments with multiple page sizes that includes determining (204) a pretranslation page size (206) for an input/output buffer (202) under an operating system that supports more than one memory page size. Buffer (202) includes a quantity of memory organized in pages having virtual page frame numbers and having at least one memory page size. That is, the memory in buffer (202) may contain pages of memory having more than one page size. Determining (204) a pretranslation page size (206) is typically carried out, if there is only one page size in the buffer, by setting the pretranslation page size to the one page size in the buffer. If there is more than one page size in the buffer, the pretranslation page size typically is set to the page size of the smallest page in the buffer.

Figure 5:
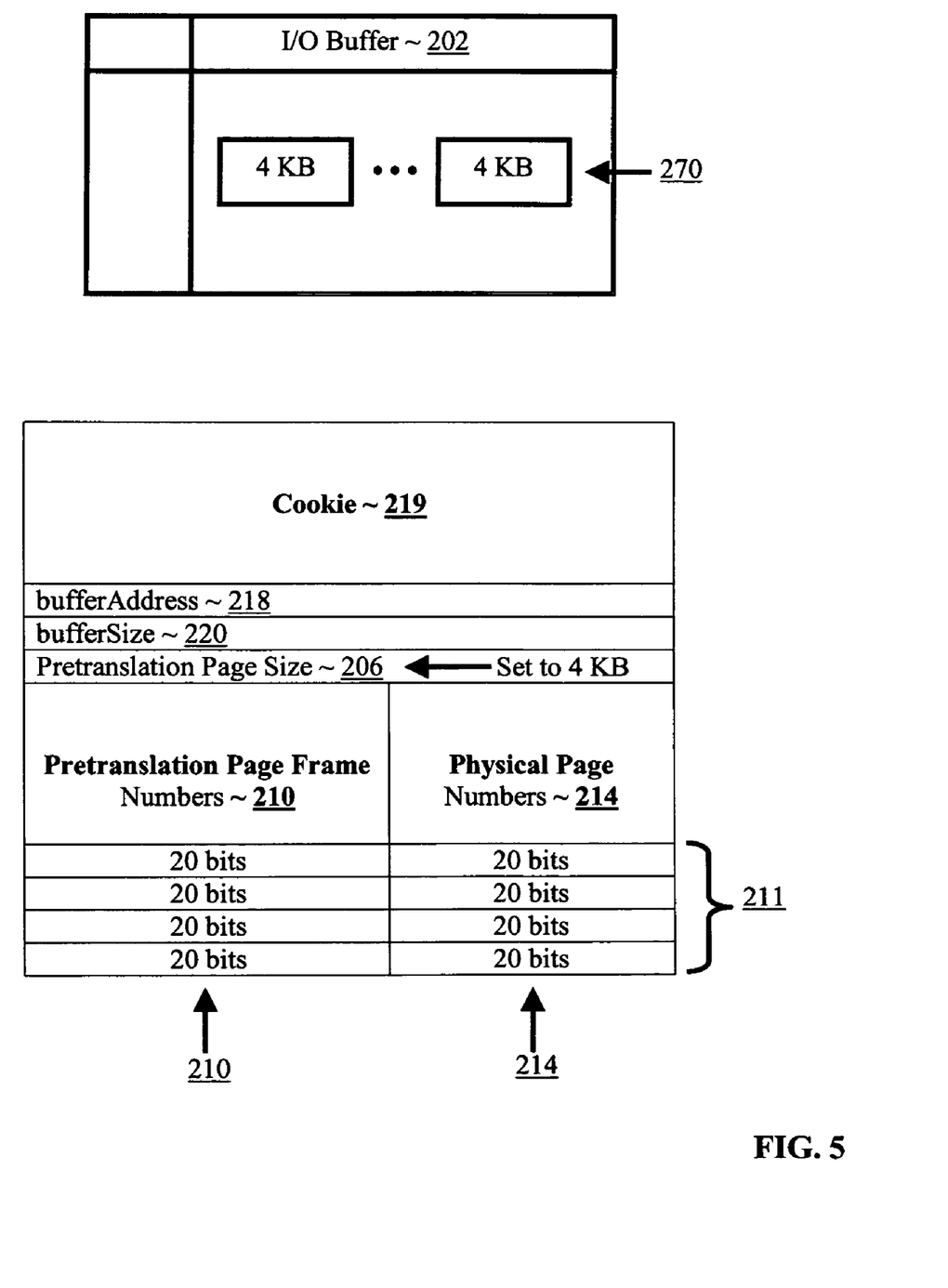
FIGS. 5, 6, and 7 set forth block diagrams illustrating three examples of cookies for three exemplary buffer configurations.
Figure 6:
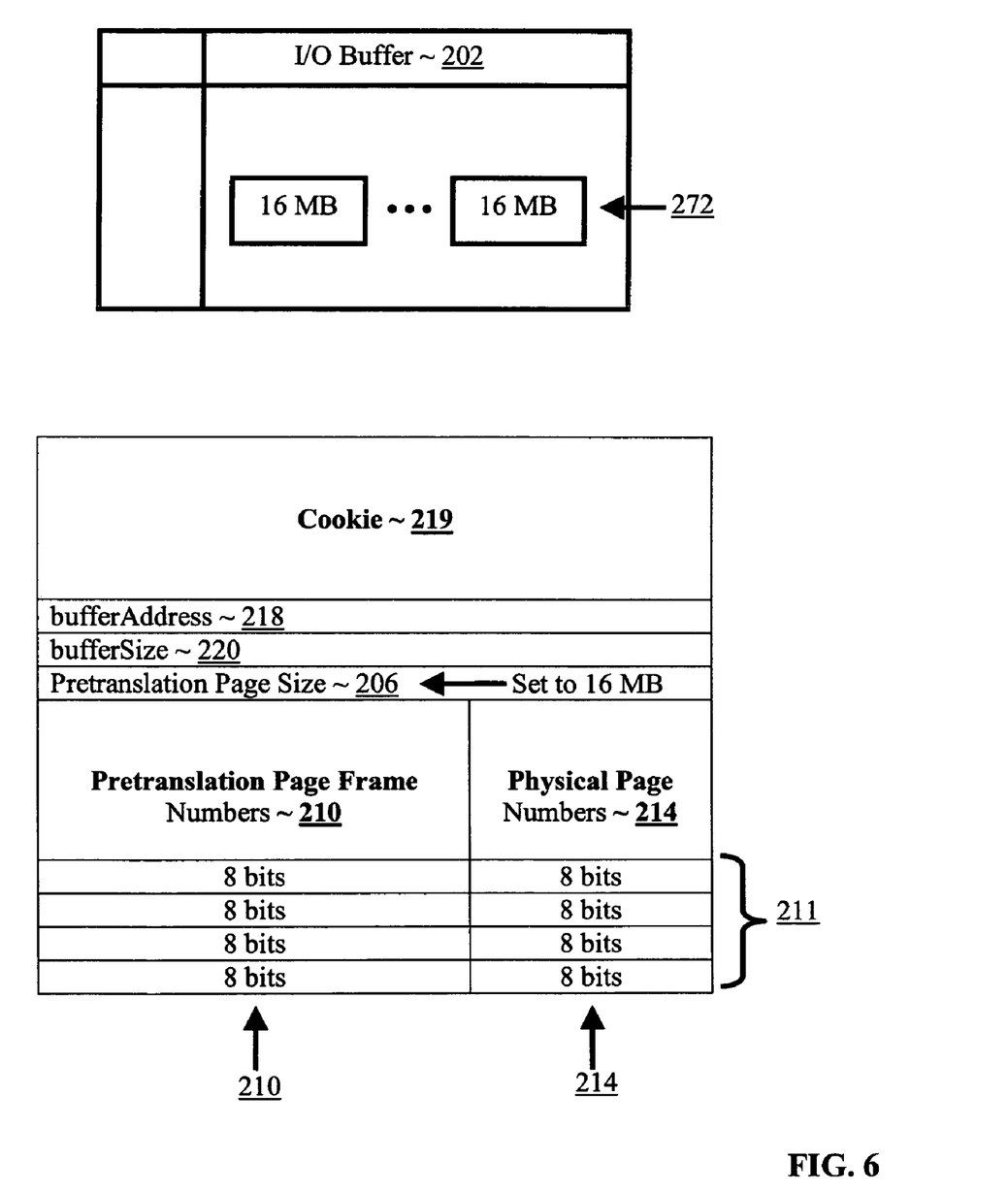
Figure 7:
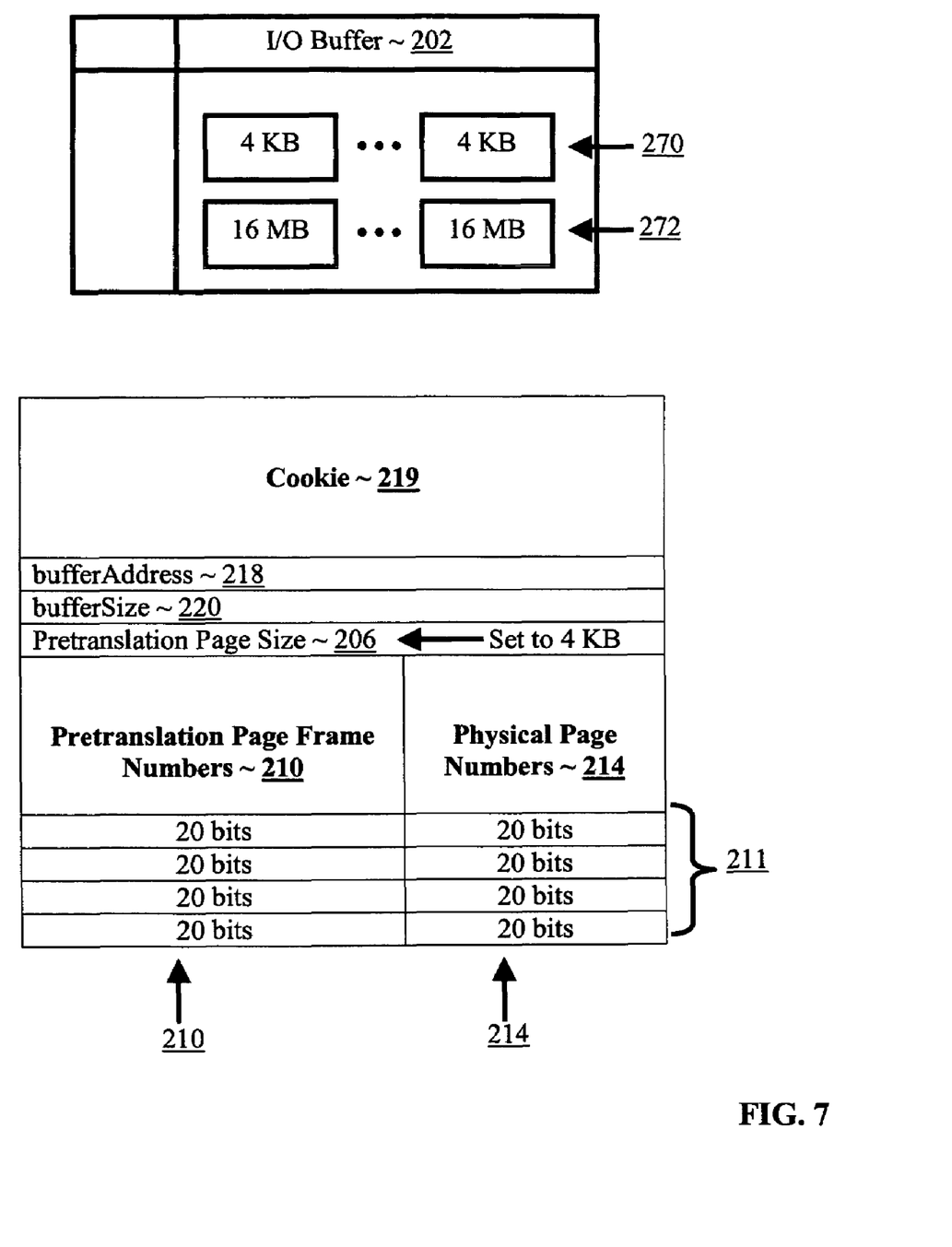

Determining (204) a pretranslation page size (206) is explained in more detail with reference to FIGS. 5, 6, and 7. FIGS. 5, 6, and 7 set forth block diagrams illustrating three examples of cookies for three exemplary buffer configurations. The examples in FIGS. 5, 6, and 7 all address a 32-bit, 4 GB address space. The buffer (202) of FIG. 5 contains pages of memory having only one size, 4 KB (270). In the example of FIG. 5, where the buffer includes pages of memory having only one page size, determining a pretranslation page size is carried out by selecting as the pretranslation page size (206) the only page size of the pages of memory in the buffer, that is, 4 KB. A 4 KB page size is represented by 12 bits. In a 32-bit address space, therefore, the pretranslation page frame numbers (210) and their corresponding physical page number (214) are represented in 32−12=20 bits each.

Similarly, the buffer (202) of FIG. 6 contains pages of memory having only one size, 16 MB (272). In the example of FIG. 6, where the buffer includes pages of memory having only one page size, determining a pretranslation page size is carried out by selecting as the pretranslation page size (206) the only page size of the pages of memory in the buffer, that is, 16 MB. A 16 MB page size is represented by 24 bits. In a 32-bit address space, therefore, the pretranslation page frame numbers (210) and their corresponding physical page number (214) are represented in 32−24 =8 bits each.

Not so similarly, the buffer (202) of FIG. 7 contains pages of memory having two page sizes, 4 KB (270) and 16 MB (272). In the example of FIG. 7, where the buffer includes pages of memory having two or more page sizes, determining a pretranslation page size is carried out by selecting as the pretranslation page size (206) the smallest page size from among the page sizes of the pages of memory in the buffer, that is, in this example, 4 KB. Again, a 4 KB page size is represented by 12 bits. In a 32-bit address space, therefore, the pretranslation page frame numbers (210) and their corresponding physical page number (214) are represented in 32−12 =20 bits each.

Figure 8:
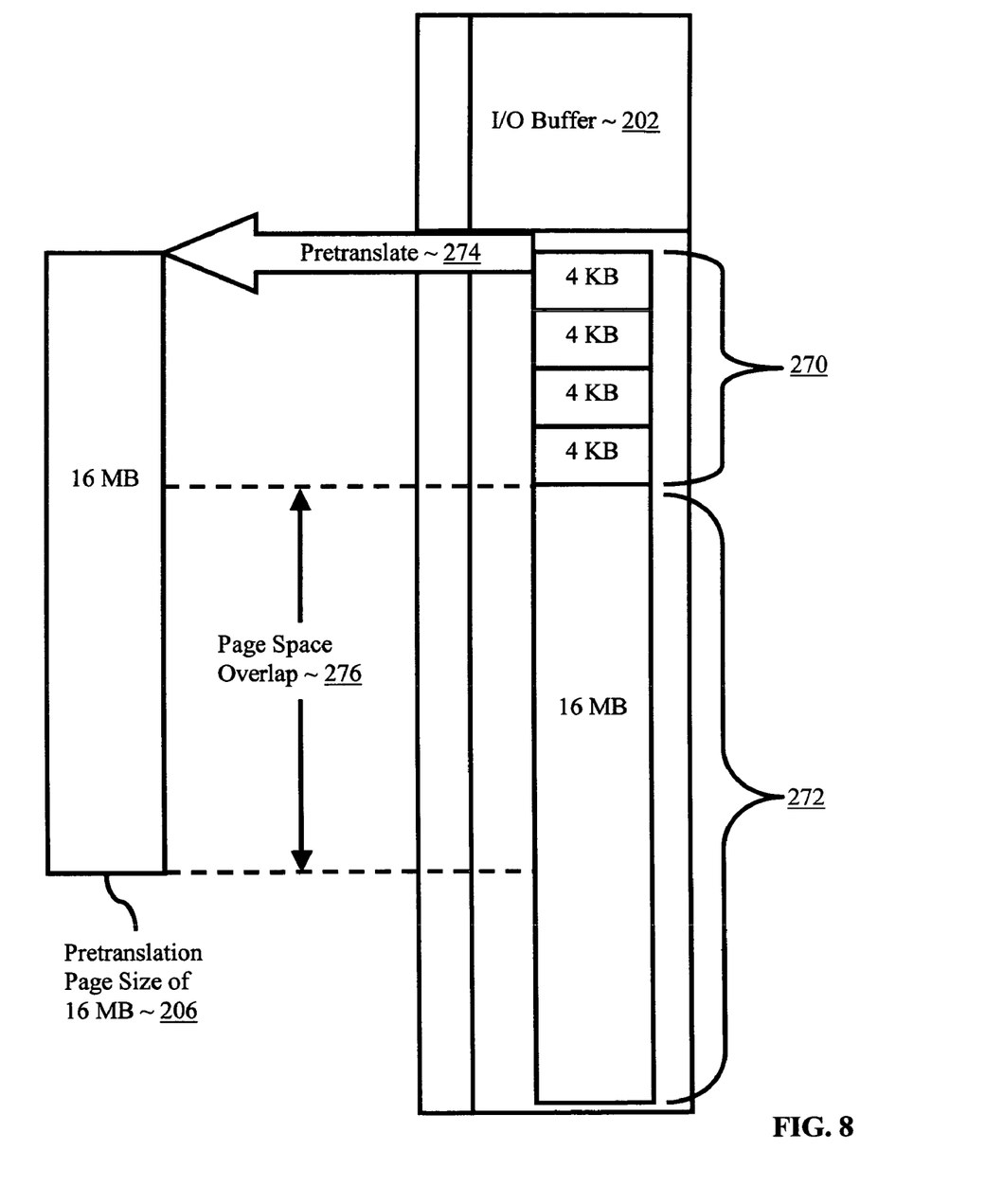
FIG. 8 sets forth a block diagram of an exemplary buffer having more than one page size.

A further explanation of the usefulness of determining a pretranslation page size for a buffer that has two or more sizes by selecting as the pretranslation page size the smallest page size in the buffer is provided with reference to FIG. 8. FIG. 8 sets forth a block diagram of an exemplary buffer having two page sizes, 4 KB (270) and 16 MB (272). The example of FIG. 8 includes a pretranslation (274) of the 4 KB portion of the buffer memory using a pretranslation page size of 16 MB (206). In other words, FIG. 8 shows the effect of selecting as the pretranslation page size the largest page size in the buffer—rather than the smallest. When the 16 MB segment (272) of the buffer is also pretranslated with a pretranslation page size of 16 MB, a page space overlap (276) is created because the translation in effect incorrectly attempts to implement a 16 MB page boundary at the beginning of the 4 KB segment (270) that is much less than 16 MB away from the 16 MB page boundary established by the operating system for the 16 MB segment (272) of the buffer. In addition, addresses treated by the translation process as having 16 MB page sizes from the 4 KB segment of the buffer will not be so treated by the operating system because the operating system allocated those pages as 4 KB pages. All which creates a risk of confusion and memory reference errors that is greatly reduced or eliminated by selecting as the pretranslation page size the smallest page size in the buffer.

Again with reference to FIG. 3: The method of FIG. 3 includes identifying (208) pretranslation page frame numbers (210) for the buffer (202) in dependence upon the pretranslation page size (206). Identifying (208) pretranslation page frame numbers (210) may be carried out, if there is only one page size in the buffer, by taking the page frame numbers of the pages in the buffer as the pretranslation page frame numbers. If there is more than one page size in the buffer, pretranslation page frame numbers for pretranslation page frames inside the larger pages may be interpolated on the basis of the smallest page size in the buffer. Such an interpolation is an interpolation of a page boundary for purposes of pretranslation within a larger memory page. That is, determining a pretranslation page size for a buffer that has two or more page sizes by selecting as the pretranslation page size the smallest page size in the buffer means that identifying pretranslation page frame numbers for the buffer in dependence upon the pretranslation page size will identify pretranslation page frame numbers for the buffer that are located inside a memory page, that is, pretranslation page frame numbers at the smaller pretranslation page size will place pretranslation page boundaries inside the larger pages of the buffer. That is, pretranslation page frame numbers are established on boundaries indicated by the pretranslation page size, even if it is the smallest supported page size, hence creating pretranslation page addresses that are not on memory page boundaries; instead, they are inside the larger memory pages as allocated by the operating system.

Figure 9:
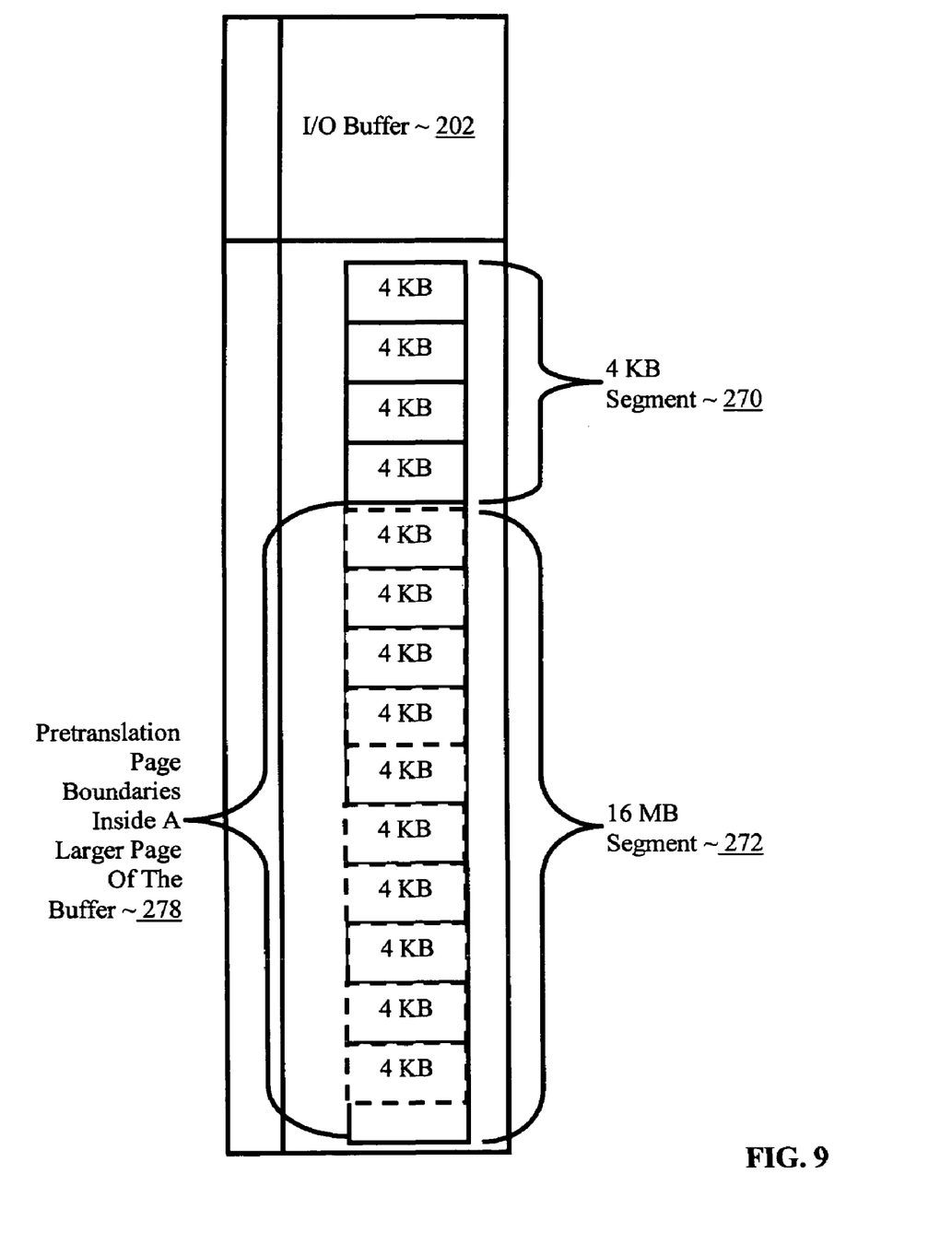
FIG. 9 sets forth a further block diagram of an exemplary buffer having more than one page size.

Identifying pretranslation page frame numbers for a buffer that are located inside a memory page is further explained with reference to FIG. 9. FIG. 9 sets forth a block diagram of an exemplary buffer having two page sizes, 4 KB (270) and 16 MB (272). That is, there are two page sizes in the buffer, one page size larger than the other. In the example of FIG. 9, and pretranslation page frame numbers for pretranslation page frames (278) inside the larger page are interpolated on the basis of the smaller page size in the buffer, that is, at 4 KB intervals. In the example of FIG. 9, determining a pretranslation page size for a buffer that has two or more page sizes by selecting as the pretranslation page size the smallest page size in the buffer results in identifying pretranslation page frame numbers for the buffer (202) that are located inside a memory page (272), that is, pretranslation page frame numbers (278) at the smaller pretranslation page size, in this example, a pretranslation page size of 4 KB, places pretranslation page boundaries (278) inside the larger pages of the buffer. Of course pretranslation page boundaries are also placed at the smaller page boundaries in the segment of the buffer having pages sized at the smaller 4 KB page size (270).

Figure 10:
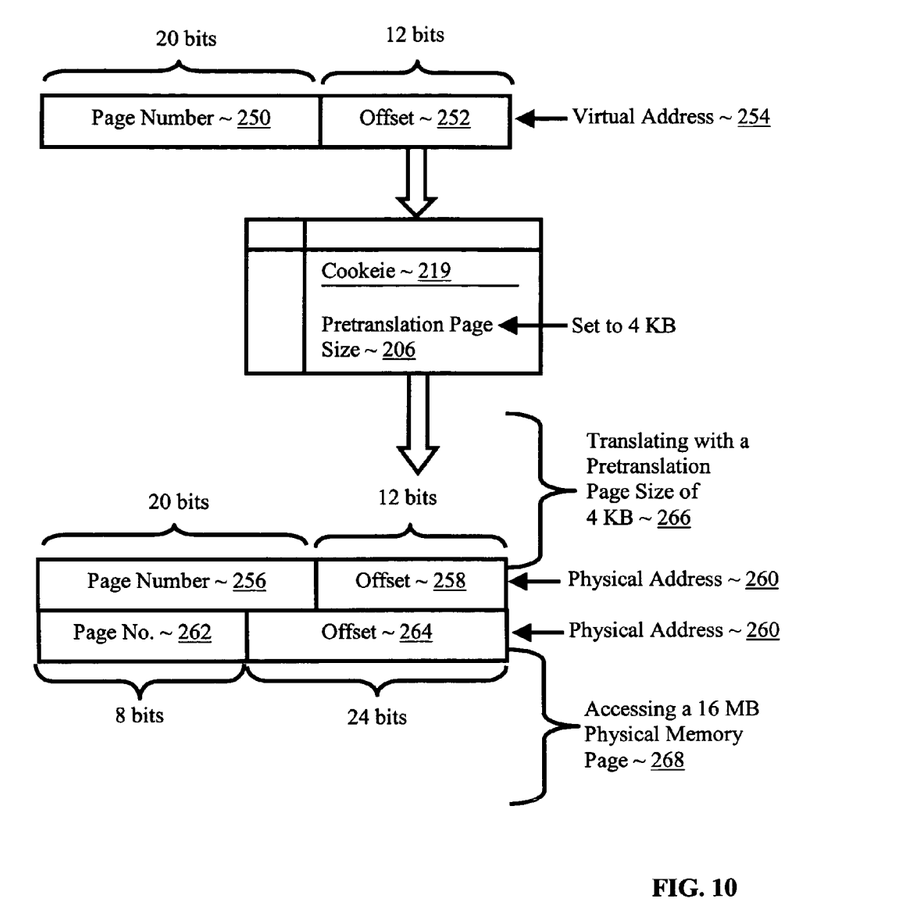
FIG. 10 sets forth a block diagram illustrating a process of memory address translation.

For further explanation, FIG. 10 sets forth a block diagram illustrating a process of memory address translation (266) for a buffer having two page sizes, 4 KB and 16 MB. In the example of FIG. 10, virtual address (254) represents a virtual memory address of a storage location in a buffer. The pertinent pretranslation page size (206) is set to 4 KB, and the virtual memory address (254) is treated as an address in a 4 KB page despite the fact that it is actually an address in a 16 MB page. That is, the size of the page number remains at 20 bits through the translation process. The physical page number (256) for the translation of the virtual page number (250) comes from the cookie data, and the offset (252, 258) is treated during translation as having the same value and the same size (12 bits) in both the virtual address (254) and the resulting physical address (260). In the process of accessing physical memory (268), however, where the operating system has set the page size for the physical page to 16 MB, the exact same physical address is treated as having a 24-bit offset (264) and an 8-bit page number (262).

Again with reference to FIG. 3: The method of FIG. 3 includes pretranslating (212) the pretranslation page frame numbers (210) to physical page numbers (214). To the extent that corresponding physical page numbers are in an operating system's page table, pretranslating (212) the pretranslation page frame numbers (210) may be carried out by reading the corresponding physical page numbers from the page table. Pretranslation page frame numbers for pretranslation pages falling inside a larger page allocated by the operating system, however, are not in an operating system's page table, however, because they are not pages allocated by the operating system. That is, such pretranslation page frame numbers are not on page boundaries as defined by the operating system but are subdivisions within a larger page that is defined by the operating system. Pretranslation page frame numbers (210) for such pretranslation pages that are not in the operating system's page table may be carried out by interpolating pretranslation page boundaries within a larger page on the basis of the pretranslation page size.

The method of FIG. 3 includes also storing (216) the physical page numbers (214) in association with the pretranslation page size (206). Storing (216) the physical page numbers (214) in association with the pretranslation page size (206) may be implemented as shown, for example, in the cookies (219) of FIGS. 5, 6, and 7. In the cookies (219) of FIGS. 5, 6, and 7, a corresponding buffer is identified by a buffer address (218), that is, the beginning address for the buffer, and the buffer is further described by including a data element for its size (220). Each cookie includes a data element recording a pretranslation page size (206) for the buffer, and each cookie contains a table (211) each of whose records represents a translation from a pretranslation page frame number (210) to a physical page number (214).

Methods for pretranslating input/output buffers in environments with multiple page sizes typically also include accessing the buffer in dependence upon the pretranslation information, pretranslation page frame numbers, physical page numbers, and a pretranslation page size. For further explanation, FIG. 4 sets forth a flow chart illustrating a method for accessing a buffer in dependence upon pretranslation information (219) that includes translating (302) a virtual memory address (308) in the buffer (202) to a physical memory address (304) in dependence upon the physical page numbers (214) stored in association with the pretranslation page size (206). Translating (302) a virtual memory address (308) in the buffer (202) may be carried out by retrieving a physical page number from a page table in a pretranslation cookie like the ones shown at reference (211) in FIGS. 5, 6, and 7, and then using the same offset value from the virtual memory address.

Figure 4:
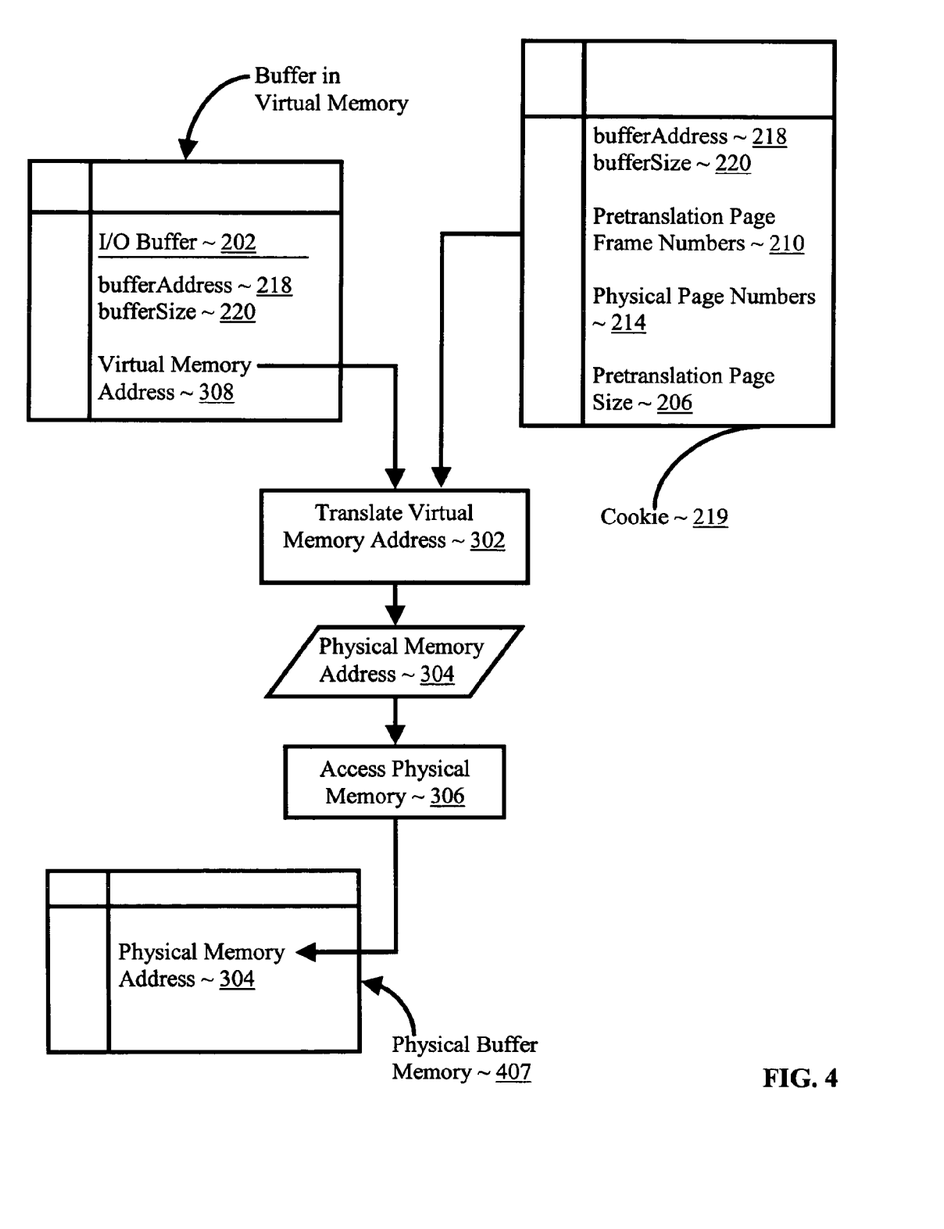
FIG. 4 sets forth a flow chart illustrating a method for accessing a buffer in dependence upon pretranslation information.

The method of FIG. 4 also includes accessing (306) the physical memory of the buffer (407) at the physical memory address (304). As mentioned above, when a buffer includes memory page having more than one page size, accessing (306) physical memory may include treating the same physical address translated with a particular pretranslation page size as though it were formulated with a different, larger page size and offset and a smaller page number.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for pretranslating input/output buffer addresses in environments with multiple page sizes, the method comprising:

determining a pretranslation page size for an input/output buffer under an operating system that supports more than one memory page size, wherein:

the buffer comprises a quantity of memory organized in pages having virtual page frame numbers and pages of memory having two or more page size; and         determining the pretranslation page size further comprises selecting as the pretranslation page size a smallest page size from among the page sizes of the pages of memory in the buffer;

identifying pretranslation page frame numbers for the buffer in dependence upon the pretranslation page size, including identifying pretranslation page frame numbers for the buffer that are located inside a memory page;

pretranslating the pretranslation page frame numbers to physical page numbers;

storing the physical page numbers in association with the pretranslation page size; and     accessing the buffer, including translating a virtual memory address in the buffer to a physical memory address in dependence upon the physical page numbers stored in association with the pretranslation page size, and accessing the physical memory of the buffer at the physical memory address.

\* \* \* \* \*